UNITED STATES PATENT OFFICE 2,588,123

PREPARATION OF VINYLTETRAHYDRO-NAPHTHALENES

Edward A. Kern, Pittsfield, Mass., assignor to General Electric Company, a corporation of New York No Drawing. Application November 13, 1946,
Serial No. 709,428

1 Claim. (Cl. 260—669)

This invention relates to monovinyltertrahydronaphthalenes, and to a method of preparing the same.

The preparation of vinyl-substituted aromatic compounds of higher molecular weight presents many difficulties because of the high boiling points of such compounds even under greatly reduced pressure, and because of the high melting points of the intermediates involved. In general, the methods which are applicable to the production of vinyl compounds of low molecular weight are not suitable for the synthesis of vinyl-substituted aromatic compounds of high molecular weight.

According to the present invention, monovinyltetrahydronaphthalenes, which may be represented by the formula

I

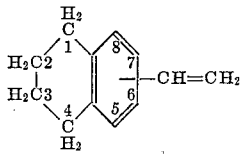

where the vinyl group may occupy either the 7 or 8 (or the 5 or 6) positions, can be prepared by dehydrating tetrahydronaphthyl methyl carbinol. Instead of the 7 and 8 positions these positions may also be designated as alpha and beta so that the invention may also be described as embracing alpha-vinyltetrahydronaphthalene or beta-vinyltetrahydronaphthalene. The latter compound can be prepared by hydrogenating monoacetyltetrahydronaphthalene under controlled reaction conditions.

Briefly stated then, the present invention involves the preparation of monovinyltetrahydronaphthalenes by acetylating tetrahydronaphthalene with an acetylating agent, e. g., acetic acid or anhydride, acetyl chloride or bromide, ketene, etc., to obtain monoacetyltetrahydronaphthalene, hydrogenating the latter to form tetrahydronaphthalene methyl carbinol and dehydrating the tetrahydronaphthalene methyl corbinol to obtain monovinyltetrahydronaphthalene.

As indicated by Formula I, more than one monovinyl derivative of tetrahydronaphthalene may be prepared by the method of my invention. More specifically, the vinyl group may be attached to the aromatic ring in either the α or β position. The position of the vinyl group is determined by the reaction conditions employed in the preparation of the respective isomers as will hereinafter be set forth in detail.

Tetrahydronaphthalene reacts readily with acetic anhydride, acetyl chloride, and other acetylating agents in the presence of a Friedel-Crafts catalyst, e. g., aluminum chloride, aluminum bromide, ferric chloride, zinc chloride, boron fluoride, sulfuric acid, etc. The chief product of this reaction is monoacetyltetrahydronaphthalene which, depending on the reaction conditions, e. g., temperature, solvent, catalyst concentration, etc., may have the acetyl group in either the α or β position on the aromatic ring. For example, I have found that if the acetylation reaction is carried out at temperatures of from about 25° C. to about 30° C., a mixture containing substantial portions of both the α and the β ketones results. At temperatures of between about —5° C. and 10° C. the β ketone is formed. At higher temperatures, for example at temperatures of between about 40° C. and about 50° C., the α acetyltetrahydronaphthalene results. Small quantities of polyketones may also be present in the reaction mass after completion of the acetylation reaction, particularly if the acetylating conditions are severe. At higher temperatures, increased quantities of polyketones result in the reaction product.

In order to facilitate control of the acetylation reaction, I have found it desirable to carry out the reaction in a solvent, e. g., carbon disulfide, nitrobenzene, carbon tetrachloride, or other solvent which, under the conditions of reaction, is inert in a Friedel-Crafts reaction. In general, the catalyst is dissolved or suspended in the solvent, and the mixture of tetrahydronapthalene and acetylating agent is then added to the catalyst solution. The addition of the reactants to the catalyst solution must be carefully controlled in order that the temperature of the reaction mixture can be maintained in the range necessary for producing the desired ketone. After completion of the reaction, the reaction mass is hydrolyzed by addition of water, and the organic layer is allowed to separate. The following equation illustrates the above described reaction when acetic anhydride is employed as the acetylating agent and aluminum chloride is the Friedel-Crafts catalyst:

II

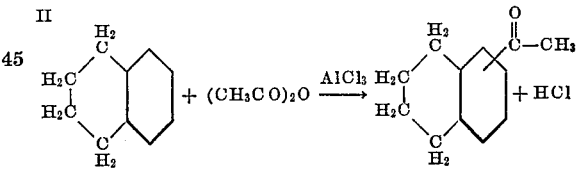

The ketone may be separated from the other products comprising the organic layer as, for example, by distillation.

The next step in the preparation of monovinyltetrahydronaphthalene is the reduction of the ketone to the tetrahydronaphthyl methyl carbinol. The reduction of the ketone is carried out, for example, by hydrogenating the monoacetyltetrahydronaphthalene in the presence of a hydrogenation catalyst, e. g., finely divided platinum, platinum oxide, palladium, copper chromite, etc. The hydrogenation is preferably carried out in a solvent medium, such as, for example, methyl alcohol. I have also found it desirable to maintain the hydrogen at super-atmospheric pressure, for example at pressures of the order of 800 to 3000 pounds per square inch. The reaction is carried out at such temperatures and for sufficient time to reduce all the ketone or ketones present in the initial reaction mixture. The reduction of the ketone to the carbinol under the above-described conditions may be illustrated briefly by the following equation:

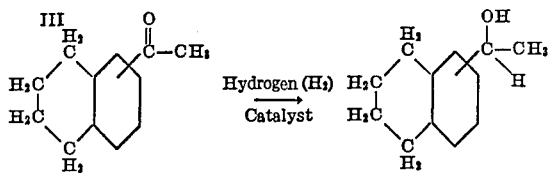

The monovinyltetrahydronaphthalene is prepared from the tetrahydronaphthalene methyl carbinol by dehydrating the carbinol. This dehydration reaction may be carried out by reacting the carbinol with any of the usual chemical dehydrating agents such, for instance, as potassium acid sulfate, zinc chloride, phosphoric anhydride, etc. However, I have found that in the production of high boiling poly-nuclear vinyl compounds such as those with which my invention is concerned, a direct vapor-phase catalytic dehydration is the preferred method. This consists in dehydrating the tetrahydronaphthalene methyl carbinol in contact with activated alumina alone or with other metallic oxides, e. g., oxides of chromium, tungsten, molybdenum, manganese, etc., more particularly by passing the vapors of the carbinol over the activated alumina or other vapor phase dehydration catalyst in a system which is maintained under reduced pressure, e. g., a pressure of 0.1 mm. to 15 mm. mercury. In carrying out this vapor-phase dehydration, the liquid carbinol is pumped at a carefully controlled rate into the still pot, which is maintained at temperatures appreciably above the boiling point of the carbinol. The rate of addition of the carbinol is such that substantially no liquid carbinol is present at any time in the still pot, the vapors passing directly to a heated catalyst chamber. In other words, the carbinol is maintained in the vapor phase as long as it is in the presence of the catalyst, or as long as it is at such temperatures that polymerization of the vinyltetrahydronaphthalene, or an undesirable condensation of the carbinol, might result. The following equation illustrates the vapor phase dehydration reaction in which activated alumina is employed as the catalyst:

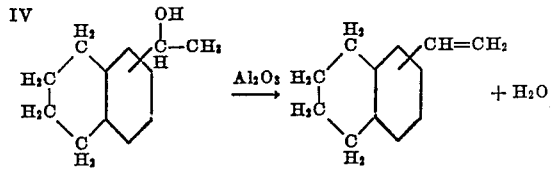

The crude product comprising the monovinyltetrahydronaphthalene may be used as such, but preferably it is purified by suitable means, for example by recrystallizing from solution, for example from a solution in petroleum ether.

In order that those skilled in the art better may understand how the present invention may be carried into effect, the following examples are given by way of illustration and not by way of limitation. All percentages are by weight.

EXAMPLE 1

*Preparation of α and β acetyltetrahydronaphthalenes*

One hundred and five (105) pounds of aluminum chloride was dissolved in 50 gallons of nitrobenzene in a glass-linked kettle, equipped with a stirrer and jacketed for heating or cooling. Continuous stirring and cooling were applied while preparing the solution. 42.2 pounds of tetrahydronaphthalene was mixed with 43.6 pounds of acetic anhydride and this mixture was pumped into the solution of aluminum chloride at such a rate that the temperature of the reaction mixture in the kettle was maintained at 25° C.±2° C. After the mixture of tetrahydronaphthalene and acetic anhydride had been added, the stirring was continued for about two hours. The reaction mixture was then hydrolyzed by adding water at such a rate that the temperature did not rise above 30° C. After the hydrolysis was complete, an excess of water was added and stirring was continued for two more hours. The stirring was then stopped, and the organic layer was allowed to separate from the aqueous layer. The aqueous layer was discarded. The organic layer was washed twice with water, then with 10% sodium carbonate solution, and finally with repeated washings of water until the washings were neutral to litmus paper.

The washed organic layer was then distilled at a pressure of about 14 mm. of mercury to separate the α and β substituted ketones from the nitrobenzene, unreacted tetrahydronaphthalene, polyketones, and tar. A yield of 21.3 pounds of a mixture of α and β monoacetyltetrahydronaphthalenes was obtained. The fraction containing the mixture of ketones was redistilled at a pressure of about 14 mm. of mercury. The products of the latter distillation were: 37.6% α acetyltetrahydronaphthalene, 49.0% β acetyltetrahydronaphthalene, 7.3% of mixture of the α and β substituted ketones and 6.1% residue. The boiling ranges of the α and β ketones at 14 mm. of mercury pressure were, respectively, 220°–222° C. and 160°–164° C.

EXAMPLE 2

*Preparation of β acetyltetrahydronapthalene*

Four hundred and sixty-seven (467) grams (3.5 moles) of anhydrous aluminum chloride suspended in 2000 cc. of carbon tetrachloride were placed in a 5-liter, three-necked, round-bottom flask, equipped with a mechanical stirrer, dropping funnel, and reflux condenser. The flask was cooled in an ice bath to 0°–5° C., and 249 cc. (3.5 moles) of acetyl chloride were added through the dropping funnel, in a period of fifteen minutes, while stirring vigorously. Three hundred and ninety-six (396) grams (3.0 moles) of tetrahydronaphthalene were added over a period of three hours. The mixture was then stirred for approximately two hours more and the resulting reaction mass was hydrolyzed by pouring into a mixture of ice and hydrochloric acid. The hydrolyzed mass was then allowed to separate into an aqueous layer and an organic layer consisting of the carbon tetrachloride solution of the reaction products. The organic layer was then washed with dilute hydrochloric acid, sodium carbonate solution, and finally with distilled water until the washings were neutral to litmus. The carbon tetrachloride was stripped from the organic layer and the crude product was distilled through a short Vigreux column. A yield of 75% of the theoretical amount of β acetyltetrahydronaphthalene, boiling at 135°–136° C. at 5 mm. of mercury pressure, was obtained.

EXAMPLE 3

*Preparation of β tetrahydronaphthalene methyl carbinol*

Five hundred (500) grams of β acetyltetrahydronaphthalene prepared as described in Example 2 was dissolved in 2000 cc. of methyl alcohol and the solution was placed in a 3800 cc. bomb shaker. Twenty-five (25) grams of copper chromite hydrogenation catalyst was added to the solution in the bomb and the bomb was closed. Hydrogen was forced into the bomb until the pressure was raised to about 1500 pounds per square inch. The bomb was then heated at about 120° C., with shaking, for about two hours. After the hydrogenation was complete, the reaction mass was removed from the bomb and the β tetrahydronaphthalene methyl carbinol was separated from the reaction mass by distillation. At completion of the reaction the reaction mass showed a negative ketone test when tested with dinitrophenylhydrazine.

EXAMPLE 4

Using the same procedure as that described in Example 3, α tetrahydronaphthalene methyl carbinol was prepared from α acetyltetrahydronaphthalene.

EXAMPLE 5

*Preparation of β vinyltetrahydronaphthalene*

β Tetrahydronaphthalene methyl carbinol was pumped through a preheating device at a measured rate of about 250 cc. per hour into a still pot, which was heated to about 20° C. above the boiling point of the carbinol at the pressure (5–10 mm. of mercury) maintained in the still pot. The carbinol was flashed up through a column one inch in diameter and 30 inches high packed with aluminum oxide pellets. The temperature of the column was maintained at 326°±3° C. The vapors leaving the column were immediately cooled to condense the β vinyltetrahydronaphthalene and to prevent polymerization of the compound. The carbinol was quantitatively dehydrated to the vinyl compound during passage of the vapors through the column. The β vinyltetrahydronaphthalene was a clear, colorless liquid boiling at 91° C. at 2 mm. of mercury pressure.

EXAMPLE 6

*Preparation of α vinyltetrahydronaphthalene*

The α vinyltetrahydronaphthalene was prepared from α tetrahydronaphthalene methyl carbinol employing the same procedure as that described in Example 5. The α vinyltetrahydronaphthalene was a clear, colorless liquid boiling at 135° C. at 2 mm. of mercury pressure. The melting point was about 25° C.

In general, the polymerization of the monovinyltetrahydronaphthalenes may be inhibited by the same compounds that inhibit the polymerization of styrene, e. g., catechol, hydroquinone, etc. Such inhibitors may be washed out of the dissolved monomer with a dilute alkali solution, if desired; or, polymerization may be carried out in the presence of a small amount of inhibitor at an elevated temperature, with or without a polymerization catalyst.

Monovinyltetrahydronaphthalenes are especially suitable for use in the preparation of polymers and co-polymers that are useful in various industrial applications, for example in the plastics and coating arts and as dielectric materials in the electrical art. They may also be employed as starting materials in the preparation of other organic compounds. The polymers and copolymers of monovinyltetrahydronaphthalenes and the methods for preparing such polymers and copolymers are described and claimed respectively in my copending applications Serial No. 709,429, now abandoned, and Serial No. 709,430, now U. S. Patent 2,507,209 issued May 9, 1950, filed concurrently herewith and assigned to the same assignee as the present invention.

What I claim as new and desired to secure by Letters Patent of the United States is:

In the process of obtaining increased yields of β-vinyltetrahydronaphthalene from the acetylation of tetrahydronaphthalene, reduction of the acetylated product, and dehydration of the carbinol, the improvement which comprises conducting the acetylation step at a temperature of from about 40° to 50° C.

EDWARD A. KERN.

REFERENCES CITED

The following references are of record in the file of this patent:

UNITED STATES PATENTS

| Number | Name | Date |
|---|---|---|
| 1,091,276 | Bergs | Mar. 24, 1914 |
| 2,067,304 | Tschunker et al. | Jan. 12, 1937 |
| 2,291,915 | Palmer et al. | Aug. 4, 1942 |
| 2,390,368 | Hochwalt | Dec. 4, 1945 |
| 2,404,235 | Karasch | July 16, 1946 |

FOREIGN PATENTS

| Number | Country | Date |
|---|---|---|
| 376,479 | Great Britain | July 14, 1932 |
| 585,541 | Germany | Oct. 5, 1933 |

OTHER REFERENCES

Kay et al.: J. Chem. Soc. 105, 1565–83 (1914)
Scharwin: Ber., vol. 35, 2511.